(12) United States Patent
Huizinga et al.

(10) Patent No.: US 8,068,187 B2
(45) Date of Patent: Nov. 29, 2011

(54) STEREOSCOPIC 3D LIQUID CRYSTAL DISPLAY APPARATUS HAVING A DOUBLE SIDED PRISM FILM COMPRISING CYLINDRICAL LENSES AND NON-CONTIGUOUS PRISMS

(75) Inventors: John S. Huizinga, White Bear Lake, MN (US); Rolf W. Biernath, Wyoming, MN (US); Vincent W. King, Woodbury, MN (US); John C. Schultz, Afton, MN (US); Michael J. Sykora, Deer Park, WI (US); Robert L. Brott, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 227 days.

(21) Appl. No.: 12/141,352

(22) Filed: Jun. 18, 2008

(65) Prior Publication Data

US 2009/0316058 A1   Dec. 24, 2009

(51) Int. Cl.
*G02F 1/1335* (2006.01)
*F21V 7/04* (2006.01)

(52) U.S. Cl. .............. 349/15; 349/65; 362/620

(58) Field of Classification Search ........... 349/15, 349/11, 13, 193, 200, 201; 362/97.1–97.4
See application file for complete search history.

(56) References Cited

U.S. PATENT DOCUMENTS

| | | | |
|---|---|---|---|
| 4,374,077 A | 2/1983 | Kerfeld | |
| 4,576,850 A | 3/1986 | Martens | |
| 5,175,030 A | 12/1992 | Lu et al. | |
| 5,271,968 A | 12/1993 | Coyle et al. | |
| 5,558,740 A | 9/1996 | Bernard et al. | |
| 5,995,690 A | 11/1999 | Kotz et al. | |
| 6,129,439 A * | 10/2000 | Hou et al. | 362/626 |
| 6,292,295 B1 | 9/2001 | Yamashita et al. | |
| 7,165,959 B2 | 1/2007 | Humlicek et al. | |
| 7,210,836 B2 | 5/2007 | Sasagawa et al. | |
| 7,224,529 B2 | 5/2007 | King et al. | |
| 7,530,721 B2 | 5/2009 | Mi et al. | |
| 2005/0243551 A1* | 11/2005 | Onishi et al. | 362/244 |
| 2005/0276071 A1* | 12/2005 | Sasagawa et al. | 362/607 |
| 2005/0276565 A1 | 12/2005 | Bourdin et al. | |
| 2007/0012934 A1* | 1/2007 | Abu-Ageel | 257/95 |
| 2008/0259634 A1* | 10/2008 | Mi et al. | 362/606 |

FOREIGN PATENT DOCUMENTS

| | | |
|---|---|---|
| JP | 2001-066547 | 3/2001 |
| WO | WO 00/48037 | 8/2000 |

OTHER PUBLICATIONS

International Search Report for International Application No. PCT/US2009/044066, dated Dec. 23, 2009.
Ishikawa et al. "New Design for a Highly Collimating Turning Film," Eastman Kodak Company, SID 06 Digest, p. 514-517, 2006.

* cited by examiner

*Primary Examiner* — Mark Robinson
*Assistant Examiner* — Paul Lee

(57) ABSTRACT

A stereoscopic 3D liquid crystal display module includes a liquid crystal display panel and a directional backlight positioned to provide light to the liquid crystal display panel. A double sided prism film is disposed between the liquid crystal display panel and the directional backlight. The prism film includes a first surface having a series of cylindrical lenses adjacent the liquid crystal display panel and a second surface, opposite the first surface, having a series of non-contiguous prisms adjacent the directional backlight. Each of the non-contiguous prisms is separated from adjacent prisms by a transmissive flat portion or an opaque portion.

6 Claims, 3 Drawing Sheets

STEREOSCOPIC 3D LIQUID CRYSTAL DISPLAY APPARATUS HAVING A DOUBLE SIDED PRISM FILM COMPRISING CYLINDRICAL LENSES AND NON-CONTIGUOUS PRISMS

BACKGROUND

3D/stereo is a technology that is growing rapidly. This technology is implemented in many ways. Stereoscopic solutions include shutter glasses, polarized glasses, and others requiring the user to wear additional equipment. Autostereoscopic solutions, which do not require additional equipment, are of increasing interest, but spatially multiplexed approaches can provide a poor viewing experience, and some techniques have been developed in an attempt to provide a good quality autostereoscopic display.

Some autostereoscopic solutions use a double sided film with contiguous features on both sides. However, this particular type of film can have some disadvantages. The thin land— either between the lenticular features and the substrate, or between the prism features and the substrate, or both—is set in thickness by the optics, but the sharp corners and the thinness of the land can cause delamination. In addition, differences in the volume and structure of the features on the double sided film can exacerbate film warping. From an optical perspective, the double sided film with contiguous features also has a broader horizontal viewing range than may be desirable.

SUMMARY

A stereoscopic 3D liquid crystal display module, consistent with the present invention, includes a liquid crystal display panel and a directional backlight positioned to provide light to the liquid crystal display panel. A double sided prism film is disposed between the liquid crystal display panel and the directional backlight. The prism film includes a first surface having a plurality of cylindrical lenses adjacent the liquid crystal display panel and a second surface, opposite the first surface, having a plurality of non-contiguous prisms adjacent the directional backlight.

A stereoscopic 3D liquid crystal display apparatus, consistent with the present invention, includes a liquid crystal display panel and a directional backlight positioned to provide light to the liquid crystal display panel. The directional backlight includes a light guide having a first side, a second side opposite the first side, a first surface extending between the first and second sides, and a second surface opposite the first surface. The first surface of the light guide substantially redirects light and the second surface substantially transmits light to the liquid crystal display panel. The directional backlight also includes a first light source disposed along the first side of the light guide and a second light source disposed along the second side the light guide. A synchronization driving element is electrically coupled to the first and second light sources, and the synchronization driving element synchronizes turning each of the first or second light sources on or off in an alternating order between the first and second sides. The apparatus also includes a double sided prism film disposed between the liquid crystal display panel and the directional backlight. The prism film includes a first surface having a plurality of cylindrical lenses adjacent the liquid crystal display panel and a second surface, opposite the first surface, having a plurality of non-contiguous prisms adjacent the directional backlight.

BRIEF DESCRIPTION OF THE DRAWINGS

The invention may be more completely understood in consideration of the following detailed description of various embodiments of the invention in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
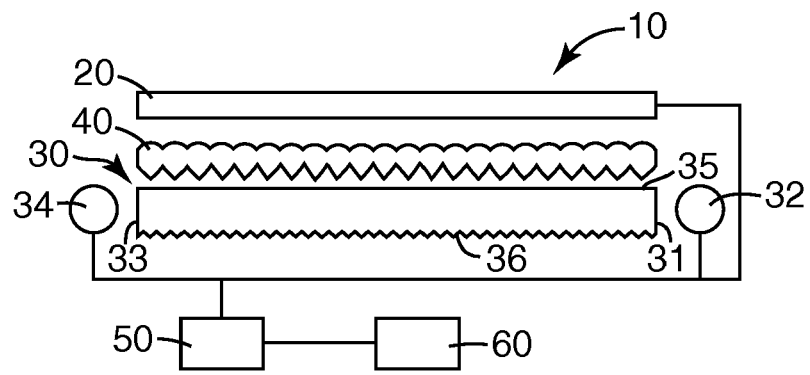
FIG. 1 is a schematic side view of an illustrative display apparatus.

In the following description, reference is made to the accompanying drawings that form a part hereof, and in which are shown by way of illustration several specific embodiments. It is to be understood that other embodiments are contemplated and may be made without departing from the scope or spirit of the present invention. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The term "autostereoscopic" refers to displaying three-dimensional images that can be viewed without the use of special headgear or glasses on the part of the user or viewer. These methods produce depth perception for the viewer even though the image is produced by a flat device. The term stereoscopic 3D incorporates the field of autostereoscopic devices but also includes the stereoscopic 3D display case in which special headgear, typically shutter glasses, are need to see stereoscopic 3D from a flat device.

The present disclosure relates to a backlit liquid crystal display apparatus and particularly to displaying stereo 3D images using liquid crystal display apparatus having a 3D film with non-contiguous prisms. Embodiments consistent with the present invention may be combined in a single display capable of providing a 3D visualization capability from a flat display either in a shutter glasses stereoscopic 3D display mode or in an autostereoscopic display mode. While the present invention is not so limited, an appreciation of various aspects of the invention will be gained through a discussion of the examples provided below.

3D Display

A liquid crystal display is a sample and hold display device such that the image at any particular point is stable until that point or pixel is updated at the next image refresh time, typically within 1/60 of a second or faster. In such a sample and hold system, displaying different images, specifically alternating left and right images for a 3D display, during sequential refresh periods of the display requires careful sequencing of the backlight light sources so that, for example, the left eye light source is not on during the display of data for the right eye and vice versa.

FIG. 1 is a schematic side view of an illustrative display apparatus 10. The display apparatus includes a liquid crystal display panel 20 and a directional backlight 30 positioned to provide light to the liquid crystal display panel 20. The directional backlight 30 includes a right eye image solid state light source 32 or plurality of first light sources 32, and a left eye image solid state light source 34 or plurality of second light sources 34, capable of being modulated between the right eye image solid state light source 32 and the left eye image solid state light source 34 at a rate of, in many embodiments, at least 90 Hertz. A double sided prism film 40 is disposed between the liquid crystal display panel 20 and the directional backlight 30.

The liquid crystal display panel 20 and/or directional backlight 30 can have any useful shape or configuration. In many embodiments, the liquid crystal display panel 20 and directional backlight 30 has a square or rectangular shape. However, in some embodiments, the liquid crystal display panel 20 and/or directional backlight 30 has more than four sides or is a curved shape. While the present disclosure is directed to any stereoscopic 3D backlight including those requiring shutter glasses or more than a single lightguide and associated liquid crystal display panel, the present disclosure is particularly useful for autostereoscopic displays.

A synchronization driving element 50 is electrically connected to the directional backlight 30, the plurality of first and second light sources 32, 34, and the liquid crystal display panel 20. The synchronization driving element 50 synchronizes activation and deactivation (i.e., modulation) of the right eye image solid state light source 32 and the left eye image solid state light source 34 as image frames are provided at a rate of, in many embodiments, 90 frames per second or greater to the liquid crystal display panel 20 to produce a flicker-free still image sequence, video stream, or rendered computer graphics. An image (e.g., video or computer rendered graphics) source 60 is connected to the synchronization driving element 50 and provides the images frames (e.g., right eye images and left eye images) to the liquid crystal display panel 20.

The liquid crystal display panel 20 can be any useful transmissive liquid crystal display panel. In many embodiments, liquid crystal display panel 20 has a frame response time of less than 16 milliseconds, or less than 10 milliseconds, or less than 5 milliseconds. Commercially available transmissive liquid crystal display panels having a frame response time of less than 10 milliseconds, or less than 5 milliseconds, or less than 3 milliseconds include, for example, the Toshiba Matsushita Display (TMD) optically compensated bend (OCB) mode panel LTA090A220F (Toshiba Matsushita Display Technology Co., Ltd., Japan).

The directional backlight 30 can be any useful directional backlight that can be modulated between a right eye image solid state light source 32 and left eye image solid state light source 34 at a rate of, in many embodiments, at least 90 Hertz, or 100 Hertz, or 110 Hertz, or 120 Hertz, or greater than 120 Hertz.

The illustrated directional backlight 30 includes a first side 31 or first light input surface 31 adjacent to the plurality of first light sources 32 or right eye image solid state light source 32 and an opposing second side 33 or second light input surface 33 adjacent to the plurality of second light sources 34 or left eye image solid state light source 34. A first surface 36 extends between the first side 31 and second side 33, and a second surface 35, opposite the first surface 36, extends between the first side 31 and second side 33. The first surface 36 substantially re-directs (e.g., reflects, extracts, and the like) light and the second surface 35 substantially transmits light. In many embodiments, a highly reflective surface is on or adjacent to the first surface 36 to assist in re-directing light out through the second surface 35.

In many embodiments, the first surface 36 includes a plurality of extraction elements such as, for example, linear prism or lenticular features as shown. In many embodiments, the linear prism or lenticular features can extend in a direction parallel to the first side 31 and second side 33 or parallel to the linear prism and lenticular features of the double sided prism film 40.

The solid state light sources can be any useful solid state light source that can be modulated at a rate of, for example, at least 90 Hertz. In many embodiments, the solid state light source is a plurality of light emitting diodes such as, for example, Nichia NSSW020B (Nichia Chemical Industries, Ltd., Japan). In other embodiments, the solid state light source is a plurality of laser diodes or organic light emitting diodes (i.e., OLEDs). The solid state light sources can emit any number of visible light wavelengths such as red, blue, and/or green, or range or combinations of wavelengths to produce, for example, white light. The directional backlight can be a single layer of optically clear material with light sources at both ends or two (or more) layers of optically clear material with a light source for each layer which preferentially extracts light in a desired direction for each layer.

The double sided prism film 40 can be any useful prism film having a lenticular structure on a first side and a prismatic structure on an opposing side. The double sided prism film 40 transmits light from the directional backlight to the liquid crystal display panel 20 at the proper angles such that a viewer perceives depth in the displayed image. Useful double sided prism films are described in U.S. Pat. Nos. 7,224,529 and 7,210,836, both of which are incorporated herein by reference as if fully set forth.

The image source 60 can be any useful image source capable of providing images frames (e.g., right eye images and left eye images) such as, for example, a video source or a computer rendered graphic source. In many embodiments, the video source can provide image frames from 50 to 60 Hertz or greater. In many embodiments, the computer rendered graphic source can provide image frames from 100 to 120 Hertz or greater.

The computer rendered graphic source can provide gaming content, medical imaging content, computer aided design content, and the like. The computer rendered graphic source can include a graphics processing unit such as, for example, an Nvidia FX5200 graphics card, a Nvidia GeForce 9750 GTX graphics card or, for mobile solutions such as laptop computers, an Nvidia GeForce GO 7900 GS graphics card. The computer rendered graphic source can also incorporate appropriate stereo driver software such as, for example, OpenGL, DirectX, or Nvidia proprietary 3D stereo drivers.

The video source can provide video content. The video source can include a graphics processing unit such as, for example, an Nvidia Quadro FX1400 graphics card. The video source can also incorporate appropriate stereo driver software such as, for example, OpenGL, DirectX, or Nvidia proprietary 3D stereo drivers.

The synchronization driving element 50 can include any useful driving element providing synchronizing activation and deactivation (i.e., modulation) of the right eye image solid state light source 32 and the left eye image solid state light source 34 with image frames provided at a rate of, for example, 90 frames per second or greater to the liquid crystal display panel 20 to produce a flicker-free video or rendered computer graphics. The synchronization driving element 50 can include a video interface such as, for example, a Westar VP-7 video adaptor (Westar Display Technologies, Inc., St. Charles, Mo.) coupled to custom solid state light source drive electronics.

Figure 2A:
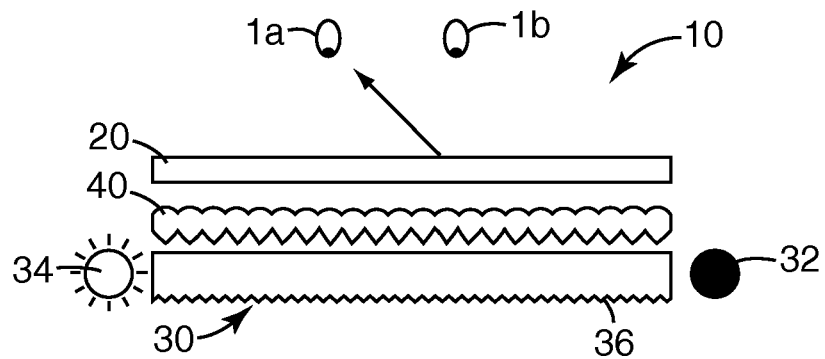
FIG. 2A and FIG. 2B are schematic side views of an illustrative display apparatus in operation.
Figure 2B:
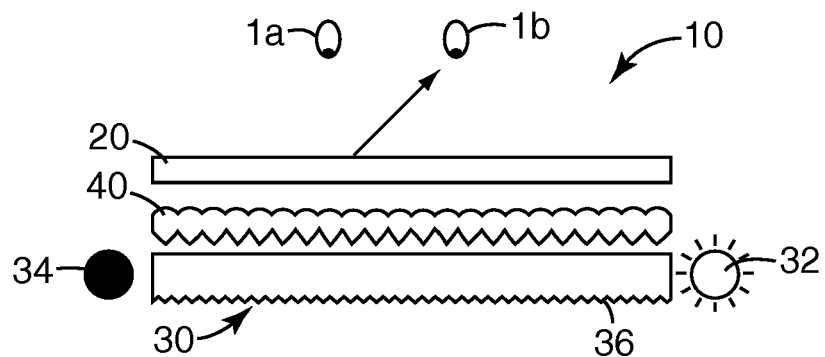

FIG. 2A and FIG. 2B are schematic side views of an illustrative display apparatus 10 in operation. In FIG. 2A the left eye image solid state light source 34 (i.e., plurality of second light sources 34) is illuminated and the right eye image solid state light source 32 (i.e., plurality of first light sources 32) is not illuminated. In this state, the light emitted from the left eye image solid state light source 34 transmits through the directional backlight 30, through the double sided prism sheet 40, and liquid crystal panel 20 providing a left eye image directed toward the left eye 1a of an viewer or observer. In FIG. 2B the right eye image solid state light source 32 is illuminated and the left eye image solid state light source 34 is not illuminated. In this state, the light emitted from the right eye solid state light source 32 transmits through the directional backlight 30, through the double sided prism sheet 40, and liquid crystal panel 20 providing a right eye image directed toward the right eye 1b of an viewer or observer. It is understood that while the right eye solid state light source 32 is located on the right side of the light guide and the left eye image solid state light source 34 is located on the left side of the light guide, is some embodiments, the right eye solid state light source 32 is located on the left side of the light guide and the left eye image solid state light source 34 is located on the right side of the light guide.

The light sources 32, 34 can be air coupled or index matched to the backlight light guide. For example, a packaged light source device (e.g., LED) can be edge-coupled without index matching material into the light guide. Alternatively, packaged or bare die LEDs can be index matched and/or encapsulated in the edge of the light guide for increased efficiency. This feature may include additional optical features, e.g., injection wedge shapes, on the ends of the light guide to efficiently transport the input light. The LEDs can be alternatively embedded in the edge or side 31, 33 of the light guide with appropriate features to efficiently collect and collimate the LED light into total internal reflection (TIR) modes of the light guide.

Liquid crystal display panels 20 have a refresh or image update rate that is variable, but for the purposes of this example, a 60 Hz refresh rate is presumed. This means that a new image is presented to the viewer every $\frac{1}{60}$ second or 16.67 milliseconds (msec). In the 3D system this means that at time t=0 (zero) the right image of frame one is presented. At time t=16.67 msec the left image of frame one is presented. At time t=2*16.67 msec the right image of frame two is presented. At time t=3*16.67 msec the left image of frame two is presented, and this process is thus repeated. The effective frame rate is half that of a normal imaging system because for each image a left eye and right eye view of that image is presented.

In this example, turning the first plurality of light sources on to light the right (or left) image at time t=0 provides light to the right (or left) image, respectively. At time t=16.67 msec the second image left or right, starts to be put in place. This image replaces the "time t=0 image" from the top of the LCD panel to the bottom of the LCD, which takes 16.67 msec to complete in this example. Non-scanned solutions turn off all the first plurality of light sources and then turns on all the second plurality of light sources sometime during this transition, typically resulting in a display with low brightness because the image data must be stable or reasonably so over the entire image if the sequential left and right images are not to be illuminated with the incorrect light source which will lead to 3D cross talk and a poor 3D viewing experience.

Providing at least 45 left eye images and at least 45 right eye images (alternating between right eye and left eye images and the images are possibly a repeat of the previous image pair) to a viewer per second provides a flicker-free 3D image to the viewer. Accordingly, displaying different right and left viewpoint image pairs from computer rendered images or images acquired from still image cameras or video image cameras, when displayed in synchronization with the switching of the light sources 32 and 34, enables the viewer to visually fuse the two different images, creating the perception of depth from the flat panel display. A limitation of this visually flicker-free operation is that, as discussed above, the backlight should not be on until the new image that is being displayed on the liquid crystal display panel has stabilized; otherwise, cross-talk and a poor stereoscopic image will be perceived.

The directional backlight 30 and associated light sources 32, 34 described herein can be very thin (thickness or diameter) such as, for example, less then 5 millimeters, or from 0.25 to 5 millimeters, or from 0.5 to 4 millimeters, or from 0.5 to 2 millimeters.

3D Films

Embodiments of the present invention help reduce the disadvantages, identified above, of the particular type of two sided film having contiguous prisms. Since the peaks of the prisms are essential elements for defining good autostereoscopic optical effects, embodiments of the present invention provide for flats or spaces between the bases of the prisms making them non-contiguous. This feature increases the land thickness and can be tailored to reduce the sharpness of the features near the film substrate, in particular providing a curvature rather than a sharp transition between the prism and the land, which improves the mechanical stability of the film and prevents cracking and delamination and reduces film warping. An additional embodiment involves placing black or opaque (light absorbing) features into the structure between the non-contiguous prisms, which can reduce off-axis light.

Figure 3A:
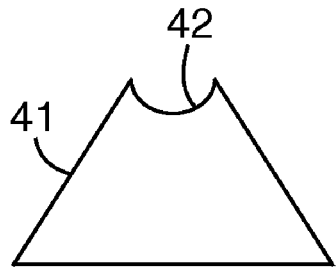
FIG. 3A is a diagram of tool used in a process to make a 3D film.
Figure 3B:
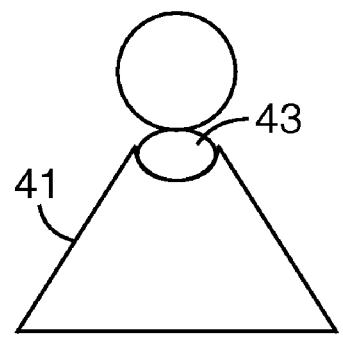
FIG. 3B is a diagram illustrating coating black material on the tool.
Figure 4:
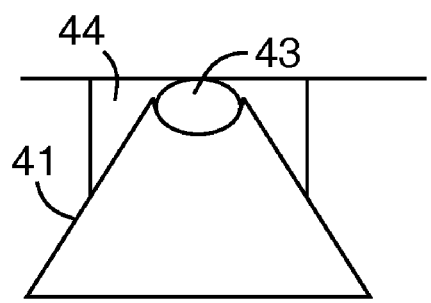
FIG. 4 is a diagram illustrating curing the optical resin.

FIGS. 3A-3B and FIG. 4 illustrate a process for making a doubled sided 3D prism film with non-contiguous prisms. FIG. 3A is a diagram of a portion of a tool used in a process to make a 3D film. The tool includes a series of non-contiguous truncated prisms 41. Only one prism is shown for illustrative purposes; the tool has as many non-contiguous prism features as necessary or desired to make the 3D film. The truncated portion of the prisms 41 may form a well 42 or a flat, or the process used to cut the prisms may leave the original tool surface, typically flat, between prisms. The tool can be made using, for example, general diamond turning techniques as described in PCT Published Application WO 00/48037, incorporated herein by reference as if fully set forth.

FIG. 3B is a diagram illustrating coating an opaque material, one type of secondary material, on the tool 41. An opaque material 43 is applied onto the truncated portion 42 of each prism 41 in a kiss coating process. An example of opaque materials to use in the 3D film include the following: black pigment filled curable binder with preferably carbon black as the pigment and an optically curable acrylate as the binder; ink including black or any absorptive color of the desired wavelength; pigment filled resin; and UV curable acrylate loaded with carbon black. In the opaque material, it may be desirable that the binder refractive index match that of the layer to which it is adhered in order to minimize interfacial reflections. In other embodiments, it may be desirable that the binder refractive index be different than that of the layer to which it is adhered in order to achieve other desired optical effects.

Figure 3C:
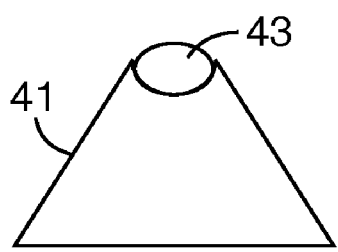
FIG. 3C is a diagram illustrating curing the black material.
Figure 3D:
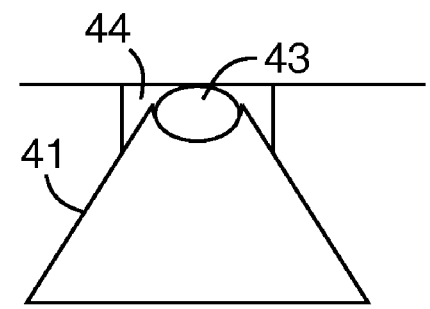
FIG. 3D is a diagram illustrating coating optical resin on the tool to form non-contiguous prisms.

The coated opaque material 43 is then cured, as illustrated in FIG. 3C. FIG. 3D is a diagram illustrating coating optical resin on the tool. After the opaque material 43 is cured, an optical resin material 44 is coated onto the tool covering the prisms 41. After coating, the optical resin material is cured, as illustrated in FIG. 4, and then removed from tool 41.

Figure 5:
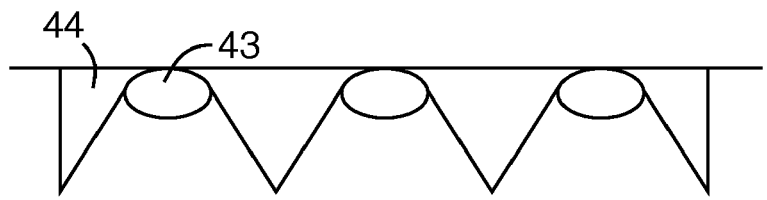
FIG. 5 is a diagram of the cured resin removed from the tool to form prisms in an optical film.
Figure 6:
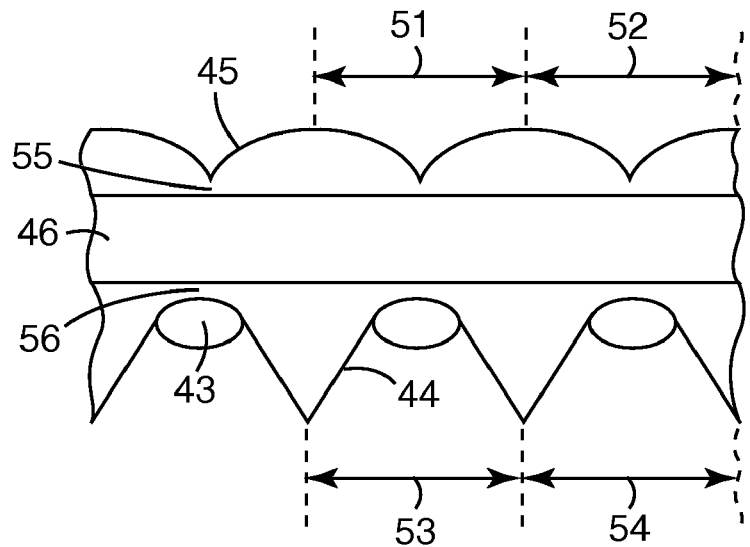
FIG. 6 is a diagram of lenses added to the optical film to form a 3D film with opaque sections between the non-contiguous prisms.

FIG. 5 is a diagram of the cured optical resin removed from the tool to form one side of an optical film having non-contiguous prisms 44 separated by opaque material. To form the complete doubled sided prism film, cylindrical lenses 45 are added to the opposed surface of the optical film, as shown in FIG. 6. The lenses can be added using another tool having cylindrical grooves to be coated on the opposed side of the optical film and then cured and removed from the other tool. The lenses and prisms for the 3D film can be made using, for example, microreplication processes such as continuous cast and cure (3C). Examples of a 3C process are described in the following patents, all of which are incorporated herein by reference as if fully set forth: U.S. Pat. Nos. 4,374,077; 4,576,850; 5,175,030; 5,271,968; 5,558,740; and 5,995,690. The lenses can be registered with the prisms in the 3D film using methods to make optical films having microreplicated registered patterns on opposed surfaces as described in U.S. Pat. Nos. 7,165,959 and 7,224,529, both of which are incorporated herein by reference as if fully set forth. The liquid from which the microreplicated structures are created is typically a curable photopolymerizable material, such as acrylates curable by UV light. Other coating materials can be used, for example a polymerizable material, and selection of a material may depend upon the particular characteristics desired for the microreplicated structures. Examples of curing methods for use in the process include reactive curing, thermal curing, or radiation curing. Although the secondary material between the prisms can be opaque, as described above, useful optical effects may be obtained by adding a material between the prisms with other useful properties such as different indices of refraction, birefringence, mechanical elasticity, and the like.

The secondary material also need not be applied on the tool which forms the microreplicated features as described above. For example, the material can be loaded into an evaporative carrier, the carrier and material coated onto the desired side of the double sided film, and the carrier evaporated. This technique will leave a residue of the loaded material, which can form a deposit of secondary material as shown in FIG. 5 and FIG. 6.

FIG. 6 is a diagram of lenses added to the optical film to form a double sided prism film with opaque sections between the non-contiguous prisms. As shown in FIG. 6, the 3D film includes a substrate portion 46, a series of lenses 45 on one side of substrate 46, and a series of non-contiguous prisms 44 separated by opaque portions 43 on the opposite side of substrate 46. The land portion 55 on the lens side and the land portion 56 on the lenticular side can each be adjusted for mechanical and optical requirements.

The pitch of the lenses and prisms can be adjusted based upon a particular implementation. The term "pitch" with respect to the lenses refers to the distance between centers of adjacent lenses, as illustrated by distances 51 and 52. The term "pitch" with respect to the prisms refers to the distance between centers of adjacent prisms, as illustrated by distances 53 and 54.

Figure 7:
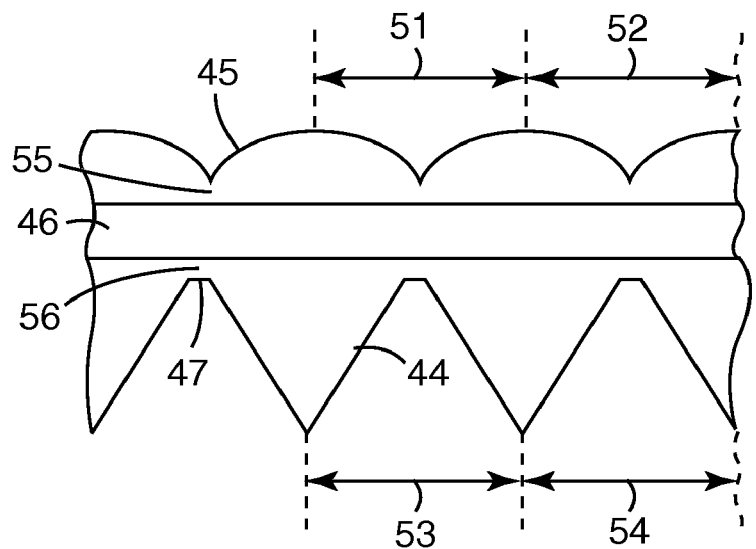
FIG. 7 is a diagram of a 3D film with transmissive portions between the non-contiguous prisms.

An alternative embodiment includes a 3D film with transmissive portions between the non-contiguous prisms. As shown in FIG. 7, the double sided prism film in this alternative embodiment includes a substrate portion 46, a series of lenses 45 on one side of substrate 46, and a series of non-contiguous prisms 44 separated by transmissive portions 47 on the opposite side of substrate 46. This film can be made in a manner similar to the film shown in FIG. 6, except that the steps shown in FIG. 3B and FIG. 3C can be eliminated such that the prisms are separated by portions of the cured optical resin without an opaque material. In addition, the tool to form the prisms can include a substantially flat top rather than the well 42 in order to form substantially flat transmissive portions between the non-contiguous prisms 44. In the film shown in FIG. 7, The land portion 55 on the lens side and the land portion 56 on the lenticular side can each be adjusted for mechanical and optical requirements. Although the lenses are shown as contiguous in FIG. 6 and FIG. 7, the lenses can alternatively be made non-contiguous.

In the 3D films of FIG. 6 and FIG. 7, the lenses and prisms can have either a constant pitch or a differential pitch. The term "constant pitch" means that the pitch of the lenses is designed to be the same as the pitch of the prisms, for example distances 51 and 52 substantially equal distances 53 and 54 possibly within an acceptable margin based upon the manufacturing process. The term "differential pitch" means that the pitch of the lenses is designed to be different from the pitch of the prisms, for example distances 51 and 52 do not equal distances 53 and 54. Also, based upon the pitch, it is possible to design the registration between the lenses and prisms such that the centers of the prisms are aligned with the centers of the lenses or, alternatively, the centers of the prisms are offset from the centers of the lenses. Either type of registration can be accomplished by the process to make films with microreplicated registered patterns in the patents identified above.

Preferred dimensions for the pitch of the lenses and prisms are usually determined, for example, by selecting a pitch that would result in the elimination or reduction of moire patterns in the LCD panel incorporating the 3D film. The pitches can also be determined based upon manufacturability. Exemplary pitch dimensions for a 3D film include the following: 26 microns; 29 microns; 29.5 microns; 70.5 microns; and 52 microns. As LCD panels are manufactured with different pixel pitches, it can be desired to change the pitch of the 3D film to accommodate the different pixel pitches. An example of a useful pitch range for a 3D film is 10 microns to 80 microns.

The invention claimed is:

1. A stereoscopic 3D liquid crystal display apparatus, comprising:
   a liquid crystal display panel;
   a directional backlight positioned to provide light to the liquid crystal display panel, the directional backlight comprising:
      a light guide having a first side, a second side opposite the first side, a first surface extending between the first and second sides, and a second surface opposite the first surface, wherein the first surface substantially re-directs light and the second surface substantially transmits light to the liquid crystal display panel;
      a first light source disposed along the first side of the light guide; and
      a second light source disposed along the second side the light guide;
   a synchronization driving element electrically coupled to the first and second light sources and the synchronization driving element synchronizes turning each of the first or second light sources on or off in an alternating order between the first and second sides; and
   a double sided prism film disposed between the liquid crystal display panel and the directional backlight, wherein the prism film comprises a first surface having a plurality of cylindrical lenses adjacent the liquid crystal display panel and a second surface, opposite the first surface, having a plurality of non-contiguous prisms adjacent the directional backlight,
   wherein the directional backlight and the double sided prism film provide for left eye images and right eye images, and the left eye images and the right eye images together provide a viewer with 3D images by a directionality of the left eye images and the right eye images transmitted to the liquid crystal display panel,
   wherein a spacing of the non-contiguous prisms is selected to maintain the directionality of the left eye images and the right eye images in order to provide the 3D images.

2. The display apparatus of claim 1, wherein the first light source and second light source each comprise one or more light emitting diodes.

3. The display apparatus of claim 1, further comprising a reflective film located adjacent to the first surface and a heat sink attached to the reflective film.

4. The display apparatus of claim 1, wherein the non-contiguous prisms include transmissive flat portions between each of the prisms.

5. The display apparatus of claim 1, wherein the non-contiguous prisms and the cylindrical lenses have a differential pitch.

6. The display apparatus of claim 1, wherein centers of the prisms are offset from centers of the cylindrical lenses.

* * * * *

UNITED STATES PATENT AND TRADEMARK OFFICE
CERTIFICATE OF CORRECTION

PATENT NO. : 8,068,187 B2
APPLICATION NO. : 12/141352
DATED : November 29, 2011
INVENTOR(S) : John Stanley Huizinga It is certified that error appears in the above-identified patent and that said Letters Patent is hereby corrected as shown below:

Column 1
Line 56, After "side" insert -- of --.

Column 6
Line 51, Delete "then" and insert -- than --, therefor.

Column 8
Line 42, Delete "7, The" and inset -- 7, the --, therefor.

Column 9
Line 25, Claim 1, After "side" insert -- of --.

Signed and Sealed this
Twenty-eighth Day of August, 2012

David J. Kappos
*Director of the United States Patent and Trademark Office*